(12) United States Patent
Uang

(10) Patent No.: US 12,461,603 B1
(45) Date of Patent: Nov. 4, 2025

(54) PORTABLE ELECTRONIC DEVICE WITH KEYBOARD

(71) Applicant: CHICONY ELECTRONICS CO., LTD., New Taipei (TW)

(72) Inventor: Kuang-Shen Uang, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 18/954,941

(22) Filed: Nov. 21, 2024

Related U.S. Application Data

(60) Provisional application No. 63/660,766, filed on Jun. 17, 2024.

(30) Foreign Application Priority Data

Jul. 31, 2024 (TW) .................................. 113128571

(51) Int. Cl.
*G06F 3/02* (2006.01)
*G06F 1/16* (2006.01)

(52) U.S. Cl.
CPC .......... *G06F 3/0202* (2013.01); *G06F 1/1662* (2013.01)

(58) Field of Classification Search
CPC .............................. G06F 3/0202; G06F 1/1662
See application file for complete search history.

(56) References Cited

U.S. PATENT DOCUMENTS

| 8,564,940 B2 * | 10/2013 | Yang | G06F 1/1616 |
| | | | 361/679.08 |
| 2015/0092332 A1 * | 4/2015 | Yu | G06F 1/1656 |
| | | | 361/679.09 |

FOREIGN PATENT DOCUMENTS

CN 101995953 A 3/2011

* cited by examiner

*Primary Examiner* — Amit Chatly
(74) *Attorney, Agent, or Firm* — MUNCY, GEISSLER, OLDS & LOWE, P.C.

(57) ABSTRACT

A portable electronic device having a keyboard includes a housing and a keyboard module. The housing includes an accommodating cavity, a first mounting hole, and a first engagement structure. The first mounting hole is located within the accommodating cavity. The first engagement structure includes a first inclined portion and a first abutting portion. One end of the first inclined portion is connected to one side wall of the first mounting hole, and the other end extends upward and is connected to the first abutting portion. The keyboard module includes a base plate, which includes a second mounting hole and a second engagement structure. The second engagement structure includes a second inclined portion and a second abutting portion. One end of the second inclined portion is connected to one side wall of the second mounting hole, and the other end extends downward and is connected to the second abutting portion.

13 Claims, 13 Drawing Sheets

PORTABLE ELECTRONIC DEVICE WITH KEYBOARD

CROSS-REFERENCE TO RELATED APPLICATION

This non-provisional application claims priority to U.S. provisional patent application Ser. No. 63/660,766 filed on Jun. 17, 2024. This and all other extrinsic materials discussed herein are hereby incorporated by reference in their entirety.

BACKGROUND

1. Technical Field

The present disclosure relates to a portable electronic device having a keyboard, particularly to a structure for assembling a portable electronic device and a keyboard module thereof.

2. Description of the Related Art

Electronic products are often used with keyboards for easier operation, or the electronic products themselves are equipped with keyboards. For example, a laptop is inherently equipped with a keyboard. Generally, the casing of the laptop that is equipped with a keyboard is referred to as C-cover, and the base plate of the keyboard is directly fixed to the upper surface of C-cover using screws or thermal melting, thereby installing the keyboard as a whole onto the laptop's C-cover.

However, there are multiple points that require fixation between the laptop and the keyboard. Currently, the assembly methods using screws or thermal melting are time-consuming and difficult or impossible to disassemble, which also means that mistakes cannot be made during assembly, increasing manufacturing costs, and there is a need for improvement.

SUMMARY

In view of the issue above, it is a primary object of the present disclosure to provide a portable electronic device having a keyboard, wherein a housing of the portable electronic device comprises at least one first engagement structure, and a base plate of a keyboard module comprises at least one second engagement structure. Through the novel structure of the first engagement structure and the second engagement structure, the problems of time-consuming and difficult disassembly in portable electronic device, caused by the conventional assembly methods such as using screws or thermal melting to fix the housing and the keyboard module, can be solved.

To achieve the above objective, the present disclosure provides a portable electronic device having a keyboard, which comprises a housing and a keyboard module. The housing comprises an accommodating cavity, at least one first mounting hole and at least one first engagement structure. The first mounting hole is located in the accommodating cavity. The first engagement structure comprises a first inclined portion and a first abutting portion. One end of the first inclined portion is connected to one side wall of the first mounting hole, and the other end of the first inclined portion extends upward and in the direction of the first mounting hole and is connected to the first abutting portion. The keyboard module comprises a base plate. The base plate comprises at least one second mounting hole and at least one second engagement structure. The second engagement structure comprises a second inclined portion and a second abutting portion. One end of the second inclined portion is connected to one side wall of the second mounting hole, and the other end of the second inclined portion extends downward and in the direction of the second mounting hole and is connected to the second abutting portion. When the keyboard module is assembled into the accommodating cavity of the housing along an assembly direction, the first abutting portion and the second abutting portion abut each other.

According to an embodiment of the present disclosure, an extension direction of the first engagement structure is parallel to the assembly direction.

According to an embodiment of the present disclosure, the second engagement structure further comprises a third inclined portion. One end of the third inclined portion is connected to the other side wall of the second mounting hole, and the other end of the third inclined portion extends downward and in the direction of the second mounting hole and is connected to the second abutting portion. Two opposite ends of the second abutting portion are respectively connected to the second inclined portion and the third inclined portion.

According to an embodiment of the present disclosure, the second engagement structure further comprises a reinforcing portion. The reinforcing portion extends downward from a side wall of the second mounting hole between the second inclined portion and the third inclined portion, and is connected to the second inclined portion and the third inclined portion.

According to an embodiment of the present disclosure, the second engagement structure is perpendicular to the assembly direction.

According to an embodiment of the present disclosure, the base plate further comprises a first positioning hole, which is disposed on one side edge of the base plate. A long-axis direction of the first positioning hole is parallel to the assembly direction. The housing comprises a first positioning post, which is located within the first positioning hole.

According to an embodiment of the present disclosure, when the keyboard module is assembled into the accommodating cavity of the housing, the first positioning post is initially placed within the first positioning hole at a lower side. After the keyboard module moves along the assembly direction, the first positioning post is located within the first positioning hole at an upper side.

According to an embodiment of the present disclosure, the base plate further comprises a second positioning hole, which is disposed on one side edge of the base plate. The housing further comprises a third positioning hole. When the first positioning post is located within the first positioning hole at the upper side, the second positioning hole overlaps with the third positioning hole.

According to an embodiment of the present disclosure, the portable electronic device further comprising a pressing strip, comprising a second positioning post. The second positioning post passes through the second positioning hole and the third positioning hole so as to fix the pressing strip on the housing.

According to an embodiment of the present disclosure, the housing further comprises a third mounting hole, which comprises a first portion and a second portion connected with each other. The base plate further comprises a third engagement structure, which comprises a connecting rod and an engagement portion. Two opposite ends of the connecting rod are respectively connected to the base plate and the engagement portion. An inner diameter of the first portion is larger than an outer diameter of the engagement portion. An inner diameter of the second portion is smaller than the outer diameter of the engagement portion and larger than an outer diameter of the connecting rod.

According to an embodiment of the present disclosure, when the keyboard module is assembled into the housing along the assembly direction, the third engagement structure is accommodated in the third mounting hole and moves from the first portion to the second portion, the engagement portion is fixed to the bottom of the second portion.

According to an embodiment of the present disclosure, the width of the second inclined portion tapers from the side wall of the second mounting hole towards the second abutting portion.

According to an embodiment of the present disclosure, the bottom of the second abutting portion is located within the first mounting hole of the housing.

According to an embodiment of the present disclosure, the base plate further comprises at least one through hole, which is located adjacent to the second mounting hole and near the second inclined portion.

In continuation of the above, the portable electronic device with the keyboard according to the present disclosure comprises the housing and the keyboard module. The housing comprises the first mounting hole and the first engagement structure. The first engagement structure comprises the first inclined portion and the first abutting portion. The base plate of the keyboard module comprises the second mounting hole and the second engagement structure. When the keyboard module is assembled into the housing, the downwardly extending second engagement structure can be inserted into the bottom of the upwardly extending first engagement structure, so that the first abutting portion and the second abutting portion abut each other, thereby quickly securing the relative position between the housing and the keyboard module. As a result, the keyboard module can be fixed to the housing by simply translating it into the accommodating cavity of the housing, thus achieving rapid assembly effect. Conversely, if the keyboard module needs to be disassembled, the same rapid disassembly effect can be achieved by moving the keyboard module in the reverse direction.

DETAILED DESCRIPTION OF THE EMBODIMENTS

In order to make the structure, characteristics, and effectiveness of the disclosure further understood and recognized, a detailed description of the disclosure is provided as follows, along with embodiments and accompanying figures.

Figure 1:
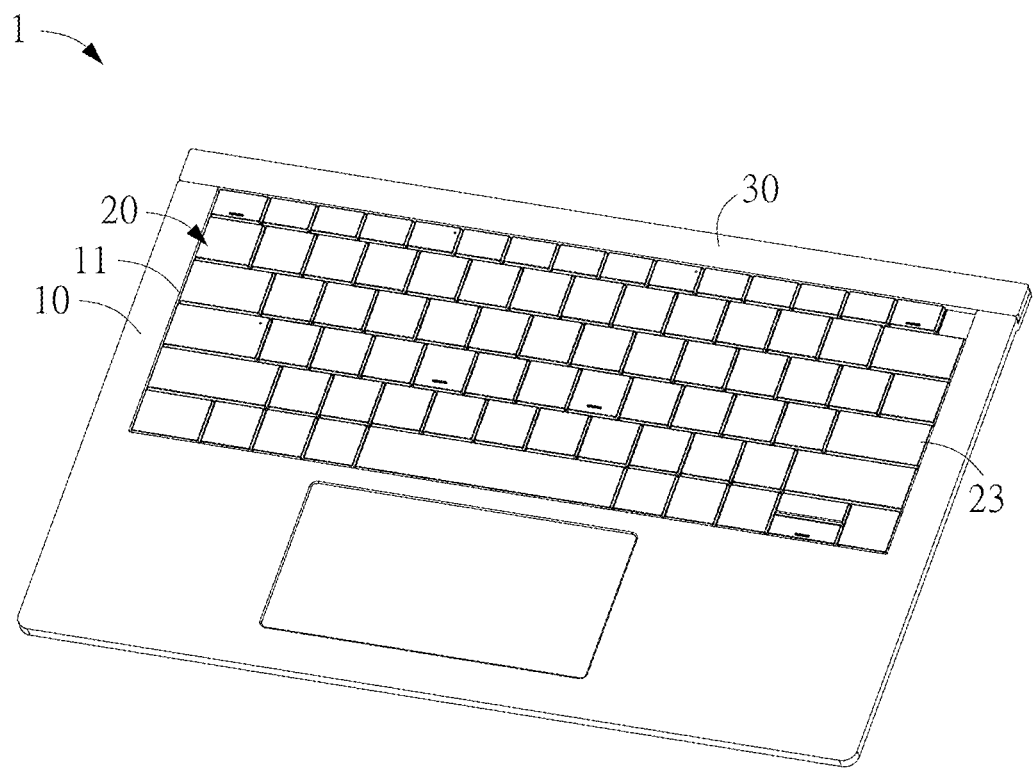
FIG. 1 is a partial schematic diagram of a portable electronic device having a keyboard according to one embodiment of the present disclosure.
Figure 2:
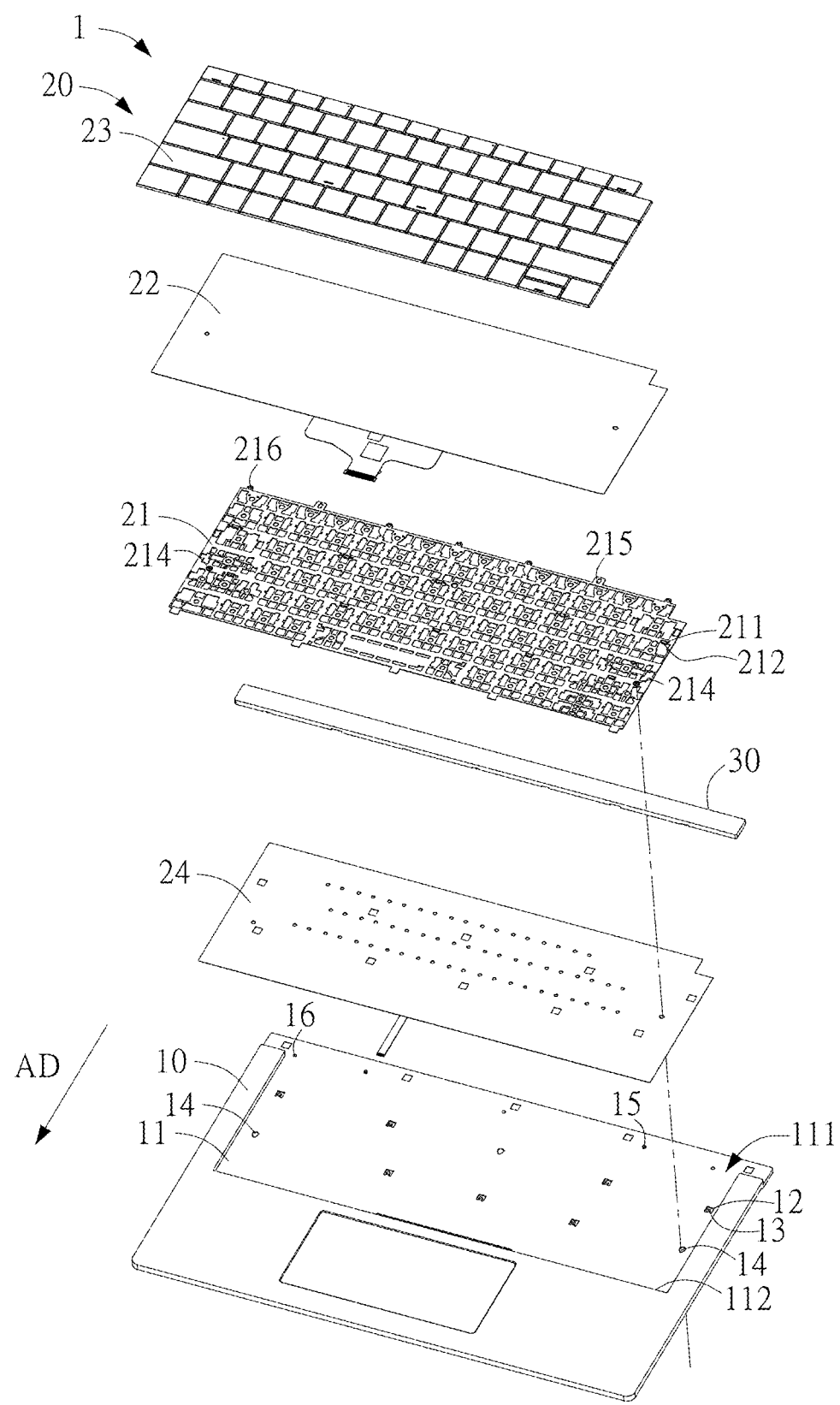
FIG. 2 is an exploded view of the housing and keyboard module as shown in FIG. 1.
Figure 3:
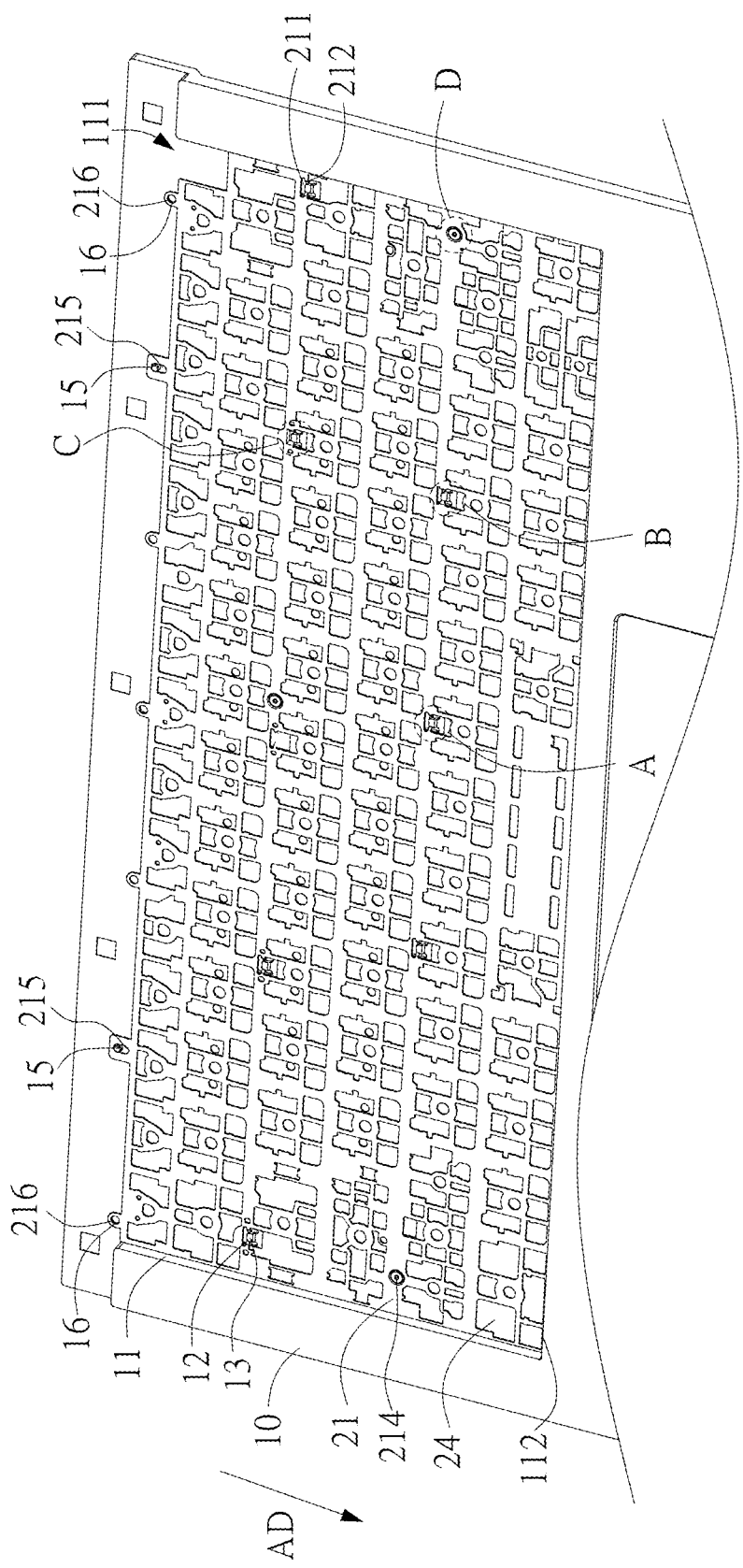
FIG. 3 is a schematic view of the base plate and backlight module assembled into the housing as shown in FIG. 2.

FIG. 1 is a partial schematic diagram of a portable electronic device having a keyboard according to one embodiment of the present disclosure; FIG. 2 is an exploded view of the housing and keyboard module as shown in FIG. 1; and FIG. 3 is a schematic view of the base plate and backlight module assembled into the housing as shown in FIG. 2. Please refer to FIG. 1, FIG. 2, and FIG. 3. In this embodiment, the portable electronic device 1 comprises a housing 10 and a keyboard module 20. Firstly, the portable electronic device 1 of this embodiment is exemplified by a laptop, and the housing 10 is the casing of the laptop's C-cover. It should be noted that the illustrations of the portable electronic device 1 in this disclosure only depict a portion of C-cover. The keyboard module 20 is installed in the housing 10 to form a portable electronic device 1 with a keyboard. In other embodiments, the portable electronic device 1 may also be a keyboard device, and the housing 10 being the casing of the keyboard device, and the present is not limited thereto.

Figure 4A:
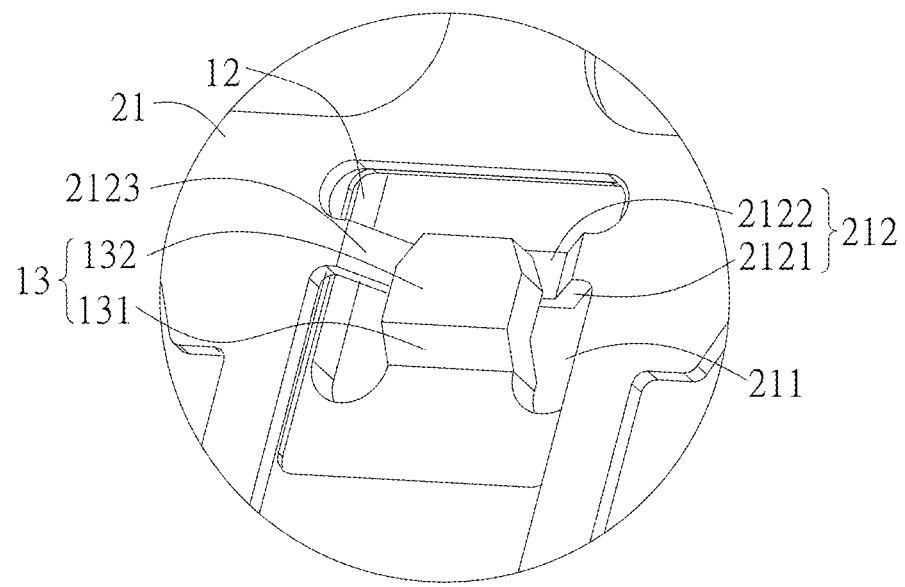
FIG. 4A is an enlarged view of area A as shown in FIG. 3.

As shown in FIG. 2, the housing 10 of this embodiment comprises an accommodating cavity 11, at least one first mounting hole 12, and at least one first engagement structure 13. The accommodating cavity 11 is an area for installing the keyboard module 20. The accommodating cavity 11 has an opening side 111, which is located at the long side of the accommodating cavity 11 and is near the hinge side (i.e., the side where the display is pivotally connected to the casing containing the motherboard, not shown in the figures) of the portable electronic device 1, so that the keyboard module 20 can be assembled into the housing 10 along the assembly direction AD, as shown in FIG. 2. In this embodiment, the assembly direction AD is parallel to the short side of the accommodating cavity 11, but the present invention is not limited thereto. Furthermore, the housing 10 of this embodiment comprises a plurality of the first mounting holes 12 and a plurality of the first engagement structures 13, which are all located within the accommodating cavity 11. FIG. 4A is an enlarged diagram of the area A as shown in FIG. 3, please refer to FIG. 4A. The first mounting hole 12 of this embodiment is an opening structure, and the first engagement structure 13 is located within the first mounting hole 12 for assembling with the keyboard module 20.

Specifically, the first engagement structure 13 comprises a first inclined portion 131 and a first abutting portion 132, as shown in FIG. 4A. One end of the first inclined portion 131 is connected to one side wall of the first mounting hole 12, and the other end of the first inclined portion 131 extends upward and in the direction of the first mounting hole 12 and is connected to the first abutting portion 132. Wherein, "upward" refers to the direction toward the keyboard module 20. In other words, one end of the first inclined portion 131 is connected to the side wall of the first mounting hole 12, and the other end extends upward and toward the interior of the first mounting hole 12. The first abutting portion 132 is a flat structure connected to the end of the first inclined portion 131 opposite to the side wall of the first mounting hole 12, so that the first engagement structure 13 forms a tongue-shaped structure. In this embodiment, the first abutting portion 132 is generally parallel to the surface of the accommodating cavity 11, but the present invention is not limited thereto.

During the manufacturing of the housing 10 in this embodiment, the first mounting hole 12 is formed by a punching process, and then the first engagement structure 13 is formed and placed within the first mounting hole 12. Furthermore, the first engagement structure 13 extends upward from the side wall of the first mounting hole 12 to form the first inclined portion 131 and the first abutting portion 132. The slanting portion is the first inclined portion 131, and the flat portion continuously extended into the first mounting hole 12 is the first abutting portion 132.

As shown in FIG. 2, the keyboard module 20 of this embodiment comprises a base plate 21, a membrane circuit board 22, and a plurality of key structures 23. The membrane circuit board 22 and the key structures 23 are disposed above the base plate 21. In other embodiments, the membrane circuit board 22 may be disposed below the base plate 21, and the present invention is not limited thereto. Preferably, the keyboard module 20 of this embodiment also comprises a backlight module 24, which is disposed below the base plate 21. The connection between the membrane circuit board 22, the key structures 23, and the backlight module 24 and the base plate 21 is well-known in the field of the present invention and will not be elaborated here.

Please refer to FIG. 3 and FIG. 4A. The base plate 21 of this embodiment comprises at least one second mounting hole 211 and at least one second engagement structure 212. Specifically, in addition to the common structural holes, the base plate 21 of this embodiment has a plurality of second mounting holes 211. The second engagement structure 212 is adjacent to the second mounting hole 211 and is used to connect to the first engagement structure 13. Further, the second mounting hole 211 may be an independent opening, or an extension of the structural hole. In this embodiment, any hole equipped with the second engagement structure 212 is referred to as the second mounting hole 211. As shown in FIG. 4A, the second engagement structure 212 comprises a second inclined portion 2121 and a second abutting portion 2122. One end of the second inclined portion 2121 is connected to one side wall of the second mounting hole 211, and the other end extends downward and in the direction of the second mounting hole 211 and is connected to the second abutting portion 2122. Here, "downward" refers to the direction toward the housing 10. In other words, one end of the second inclined portion 2121 is connected to the side wall of the second mounting hole 211, and the other end of the second inclined portion 2121 extends downward and toward the interior of the second mounting hole 211. The second abutting portion 2122 is a flat structure and is connected to the end of the second inclined portion 2121 opposite to the sidewall of the second mounting hole 211.

During the manufacturing of the base plate 21 in this embodiment, the second mounting hole 211 is formed simultaneously when punching the structural hole, followed by the formation of the second engagement structure 212. In this embodiment, the second engagement structure 212 is located within the second mounting hole 211, and is extended from the side wall of the second mounting hole 211 to form the second inclined portion 2121 and the second abutting portion 2122. The downward-slanting portion is the second inclined portion 2121, and the flat portion continuously extended into the second mounting hole 211 is the second abutting portion 2122. In this embodiment, the second abutting portion 2122 is generally parallel to the surface of the base plate 21, but the present invention is not limited thereto. Therefore, when the keyboard module 20 is assembled into the accommodating cavity 11 of the housing 10, the downward extended second engagement structure 212 can be inserted into the bottom side of the upward extended first engagement structure 13, allowing the first abutting portion 132 to abut against the second abutting portion 2122. This arrangement quickly secures the relative position between the housing 10 and the keyboard module 20. The operation of assembling the keyboard module 20 into the housing 10 will be further described below. The following section describes other structural features of the first engagement structure 13 and the second engagement structure 212 of this embodiment.

Preferably, the second engagement structure 212 further comprises a third inclined portion 2123. One end of the third inclined portion 2123 is connected to the other side wall of the second mounting hole 211, for example, the side wall opposite to the second inclined portion 2121. Additionally, the other end of the third inclined portion 2123 extends downward and in the direction of the second mounting hole 211 and is connected to the second abutting portion 2122. In other words, the two opposite ends of the second abutting portion 2122 are respectively connected to the second inclined portion 2121 and the third inclined portion 2123, and both the second inclined portion 2121 and the third inclined portion 2123 extend downward and toward the second mounting hole 211, so that the second engagement structure 212 forms a bridge-like support structure.

Please refer to FIG. 2 and FIG. 3. In this embodiment, the keyboard module 20 can be assembled into the housing 10 along the assembly direction AD. The assembly direction AD is preferably parallel to the short axis of the housing 10. In this embodiment, the extension direction of the first engagement structure 13 is parallel to the assembly direction AD. In other words, the tongue-shaped structure of the first engagement structure 13 is parallel to the assembly direction AD. Furthermore, the second engagement structure 212 is perpendicular to the assembly direction AD. That is, the bridge-like support structure of the second engagement structure 212 is oriented perpendicularly to the assembly direction AD. Therefore, when the keyboard module 20 is assembled into the housing 10 along the assembly direction AD, the second engagement structure 212 can directly insert into the bottom side of the first abutting portion 132, so that the first abutting portion 132 and the second abutting portion 2122 abut each other.

In other embodiments, the first engagement structure 13 may also be a bridge-like support structure extending upward and oriented perpendicular to the assembly direction. Correspondingly, the second engagement structure 212 would be a tongue-shaped structure extending downward, with its extension direction parallel to the assembly direction. This configuration can similarly achieve the effect of quickly securing the relative position between the housing 10 and the keyboard module 20. The angle between the first engagement structure 13 and the second engagement structure 212 can also be adjusted according to the actual needs, and the present invention is not limited thereto.

Figure 4B:
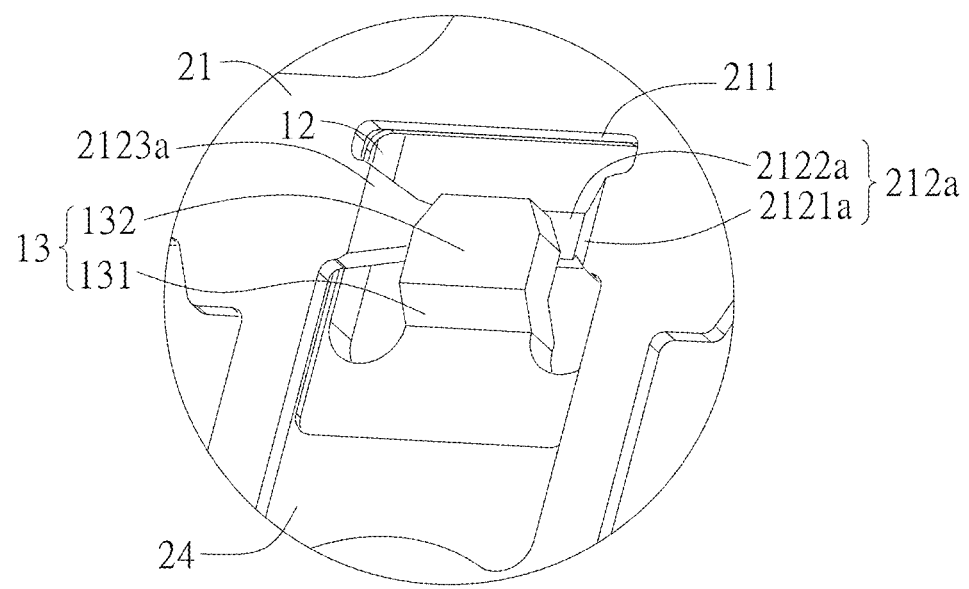
FIG. 4B is an enlarged view of area B as shown in FIG. 3.

FIG. 4B is an enlarged view of the area B as shown in FIG. 3. Please refer to FIG. 4A and FIG. 4B. As shown in FIG. 4A, the second engagement structure 212 may maintain a uniform width, meaning that the widths of the second inclined portion 2121, the second abutting portion 2122, and the third inclined portion 2123 are identical. As shown in FIG. 4B, the base plate 21 of this embodiment may also comprise a second engagement structure 212a with varying widths. Preferably, the width of the second inclined portion 2121a of the second engagement structure 212a tapers from the sidewall of the second mounting hole 211 toward the second abutting portion 2122a. Similarly, the width of the third inclined portion 2123a tapers from the sidewall of the second mounting hole 211 toward the second abutting portion 2122a. With the aforementioned structure, the second inclined portion 2121a and the third inclined portion 2123a form a trapezoid-like structure that tapers toward the second abutting portion 2122a, which can enhance the structural strength of the second engagement structure 212a.

Figure 4C:
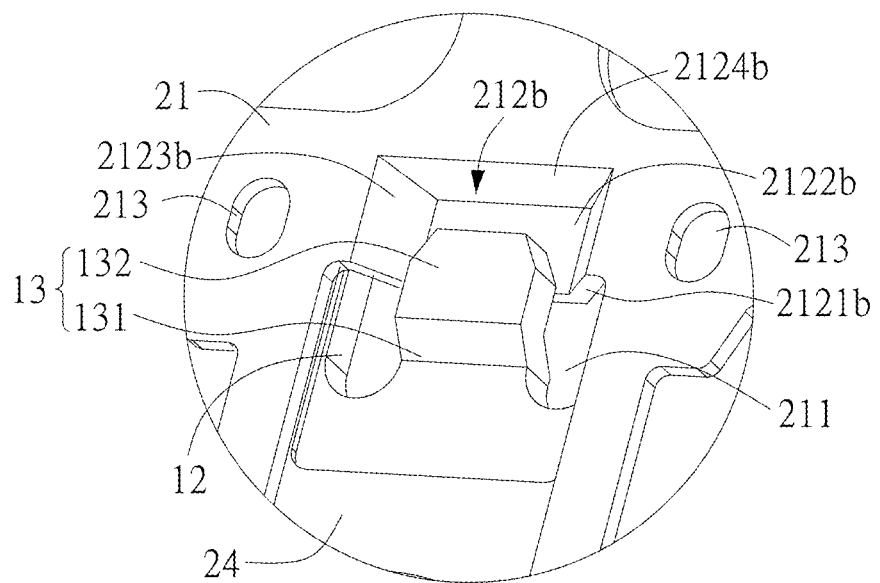
FIG. 4C is an enlarged view of area C as shown in FIG. 3.

Additionally, the base plate 21 of this embodiment further comprises a closed-type second engagement structure 212b, which is adjacent to the second mounting hole 211, as shown in FIG. 4C. FIG. 4C is an enlarged view of area C as shown in FIG. 3. The second engagement structure 212b of this embodiment further comprises a reinforcing portion 2124b that extends downward from one sidewall of the second mounting hole 211 located between the second inclined portion 2121b and the third inclined portion 2123b, and connects with both the second inclined portion 2121b and the third inclined portion 2123b to form a closed structure. In other words, the reinforcing portion 2124b is located between the second inclined portion 2121b and the third inclined portion 2123b, and the two opposite sides of the reinforcing portion 2124b respectively connect the second inclined portion 2121b and the third inclined portion 2123b to form a closed structure. The configuration of the reinforcing portion 2124b enhances the structural strength of the second engagement structure 212b.

Preferably, as shown in FIG. 4C, the base plate 21 of this embodiment also comprises at least one through hole 213, which is adjacent to the second mounting hole 211 and near the second inclined portion 2121b. In this embodiment, the opposite sides of the second mounting hole 211 each are provided with a through hole 213, located near the second inclined portion 2121b and the third inclined portion 2123b, respectively. The base plate 21 of this embodiment is manufactured by punching and stretching to form a bridge-like support structure of second engagement structure 212b. The design of the through hole 213 prevents deformation during the stretching process of the second engagement structure 212b. This embodiment uses a closed-type second engagement structures 212b with through holes 213 on both sides (as shown in FIG. 4C). In other embodiments, the second engagement structure 212 with a uniform width (as shown in FIG. 4A) or the tapered-width second engagement structure 212a (as shown in FIG. 4B) may also be designed with through holes 213 on both sides.

Figure 4D:
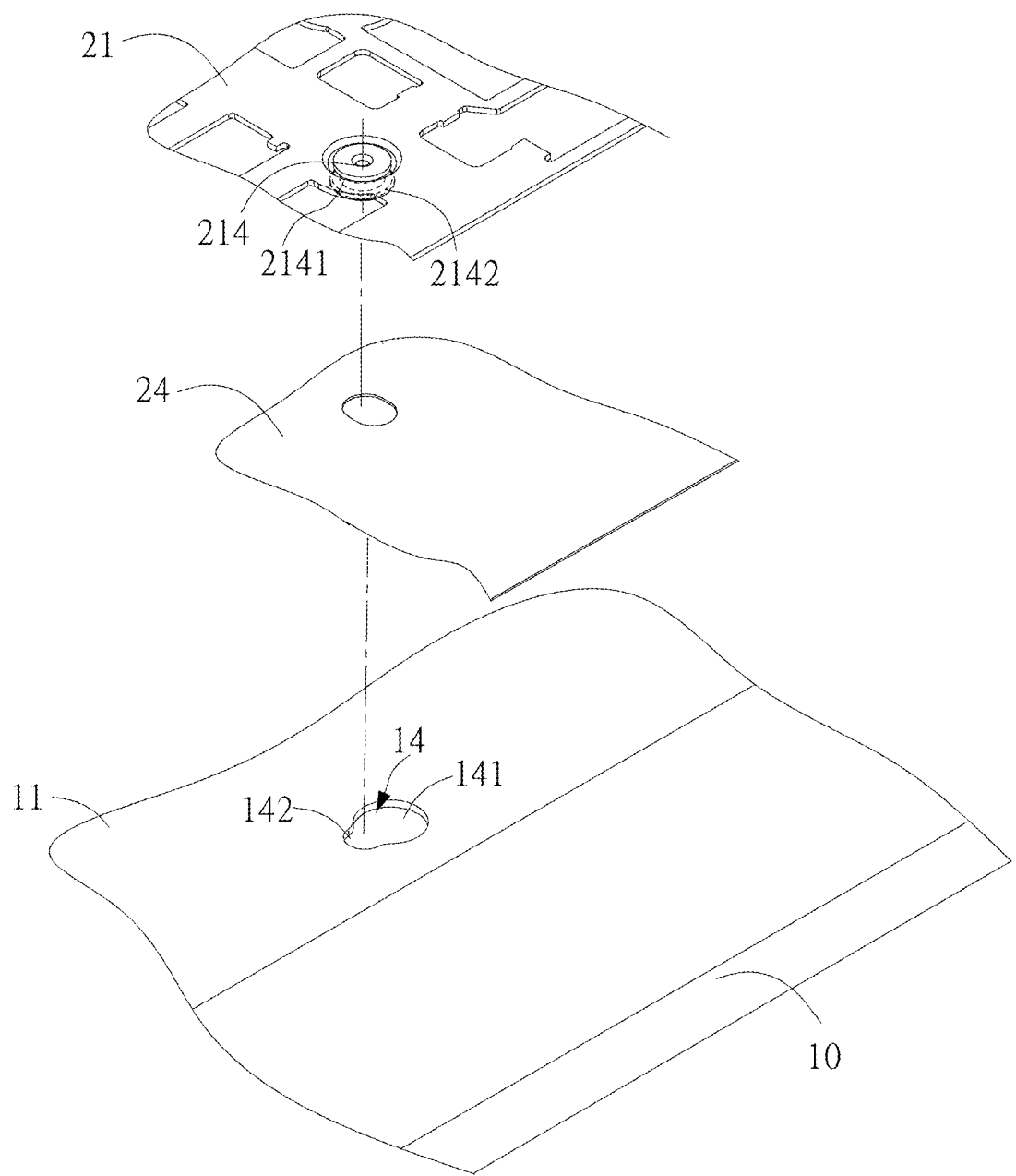
FIG. 4D is an exploded view of area D as shown in FIG. 3.

FIG. 4D is an exploded view of area D as shown in FIG. 3. Please refer to FIG. 3 and FIG. 4D. Preferably, the housing 10 of this embodiment further comprises a third mounting hole 14, which is located within the accommodating cavity 11. The third mounting hole 14 comprises a first portion 141 and a second portion 142 connected with each other. The inner diameter of the first portion 141 is larger than that of the second portion 142, so that the third mounting hole 14 forms a gourd-shaped hole. In addition, the third mounting hole 14 is arranged along the assembly direction AD, with the first portion 141 followed by the second portion 142 in sequence. Moreover, the base plate 21 comprises a third engagement structure 214, which comprises a connecting rod 2141 and an engagement portion 2142. The two opposite ends of the connecting rod 2141 are connected to the base plate 21 and the engagement portion 2142, respectively. Further, the outer diameter of the connecting rod 2141 is smaller than that of the engagement portion 2142. In this embodiment, the third engagement structure 214 can be a rivet fastened to the base plate 21. Specifically, the head of the third engagement structure 214 (i.e., the rivet) is riveted to the base plate 21, and the other structures (i.e., the connecting rod 2141 and the engagement portion 2142) pass through the base plate 21 and are positioned at the bottom of the base plate 21.

In this embodiment, the inner diameter of the first portion 141 of the third mounting hole 14 is larger than the outer diameter of the engagement portion 2142. When the keyboard module 20 is assembled into the accommodating cavity 11 of the housing 10, the engagement portion 2142 can first pass through the first portion 141 to the underside of the housing 10, allowing the third engagement structure 214 to be accommodated in the first portion 141 of the third mounting hole 14. Further, the inner diameter of the second portion 142 is smaller than the outer diameter of the engagement portion 2142 and larger than the outer diameter of the connecting rod 2141. The inner diameter of the second portion 142 being larger than the connecting rod 2141 allows the third engagement structure 214 to move back and forth between the first portion 141 and the second portion 142 of the third mounting hole 14 through the connecting rod 2141. As the keyboard module 20 is assembled into the housing 10 along the assembly direction AD, the third engagement structure 214 moves from the first portion 141 to the second portion 142 via the connecting rod 2141. Because the inner diameter of the second portion 142 is smaller than the outer diameter of the engagement portion 2142, so that the engagement portion 2142 can be fixed at the bottom of the second portion 142, thereby securing the relative position between the keyboard module 20 and the housing 10. Accordingly, the design of the third mounting hole 14 and the third engagement structure 214 can also achieve the effect of quickly assembling and disassembling the keyboard module 20 and the housing 10.

Figure 5:
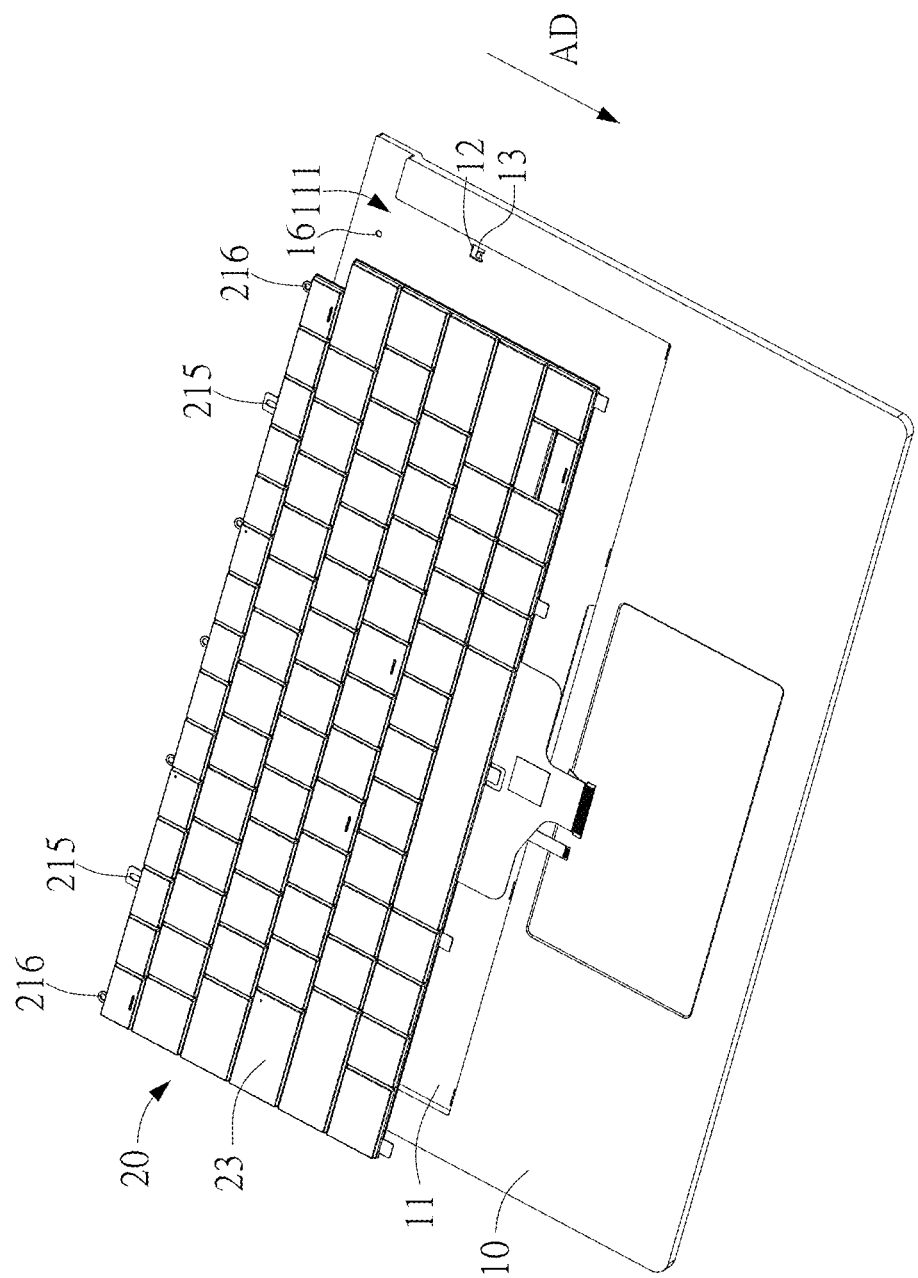
FIG. 5 is a schematic diagram of the keyboard module and housing before assembly as shown in FIG. 1.
Figure 6:
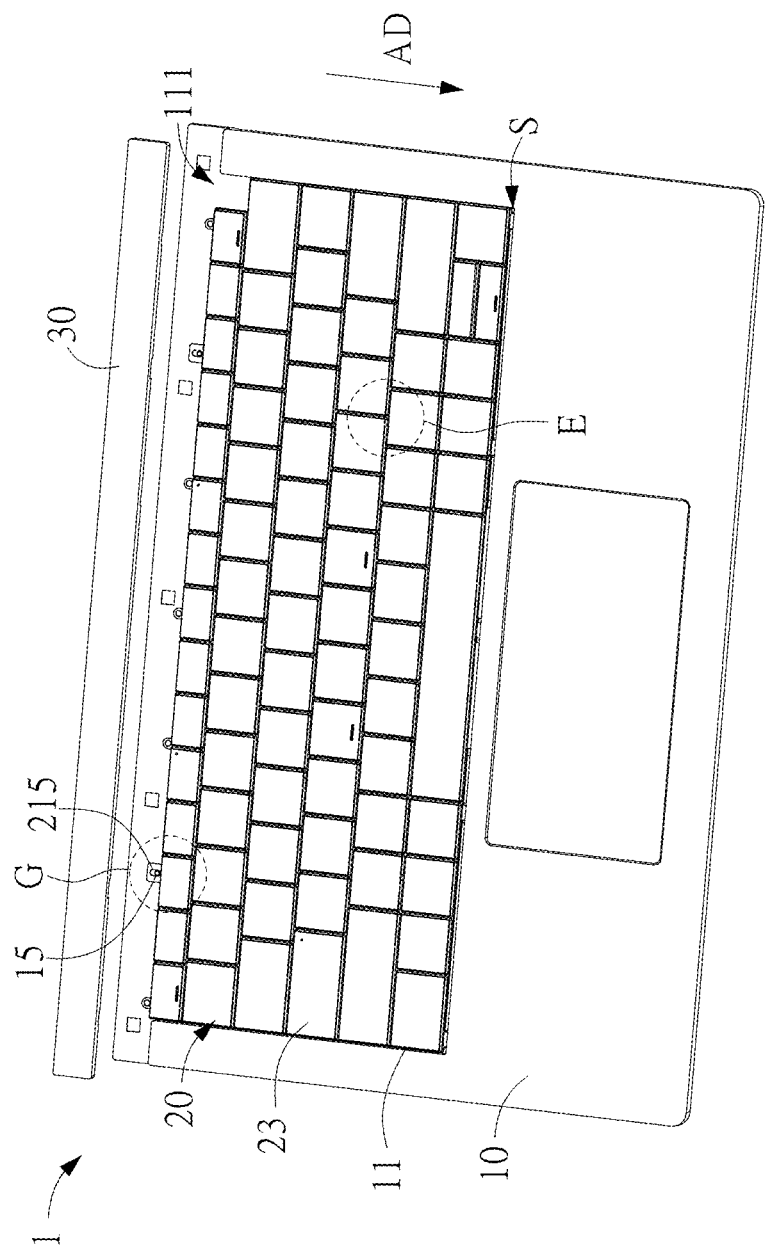
FIG. 6 is a schematic diagram of the keyboard module being placed into the accommodating cavity of the housing as shown in FIG. 5.
Figure 7:
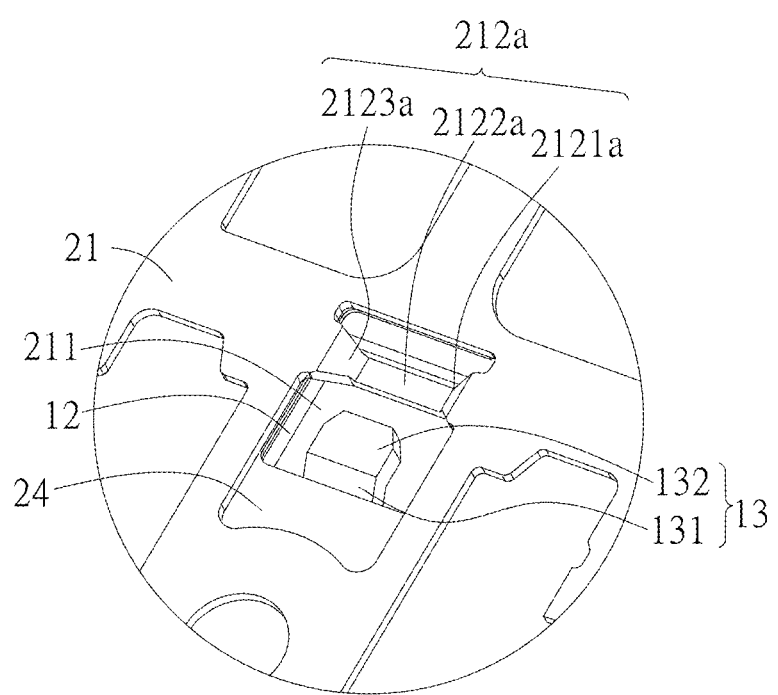
FIG. 7 is an enlarged view of the base plate and housing in area E as shown in FIG. 6.
Figure 8:
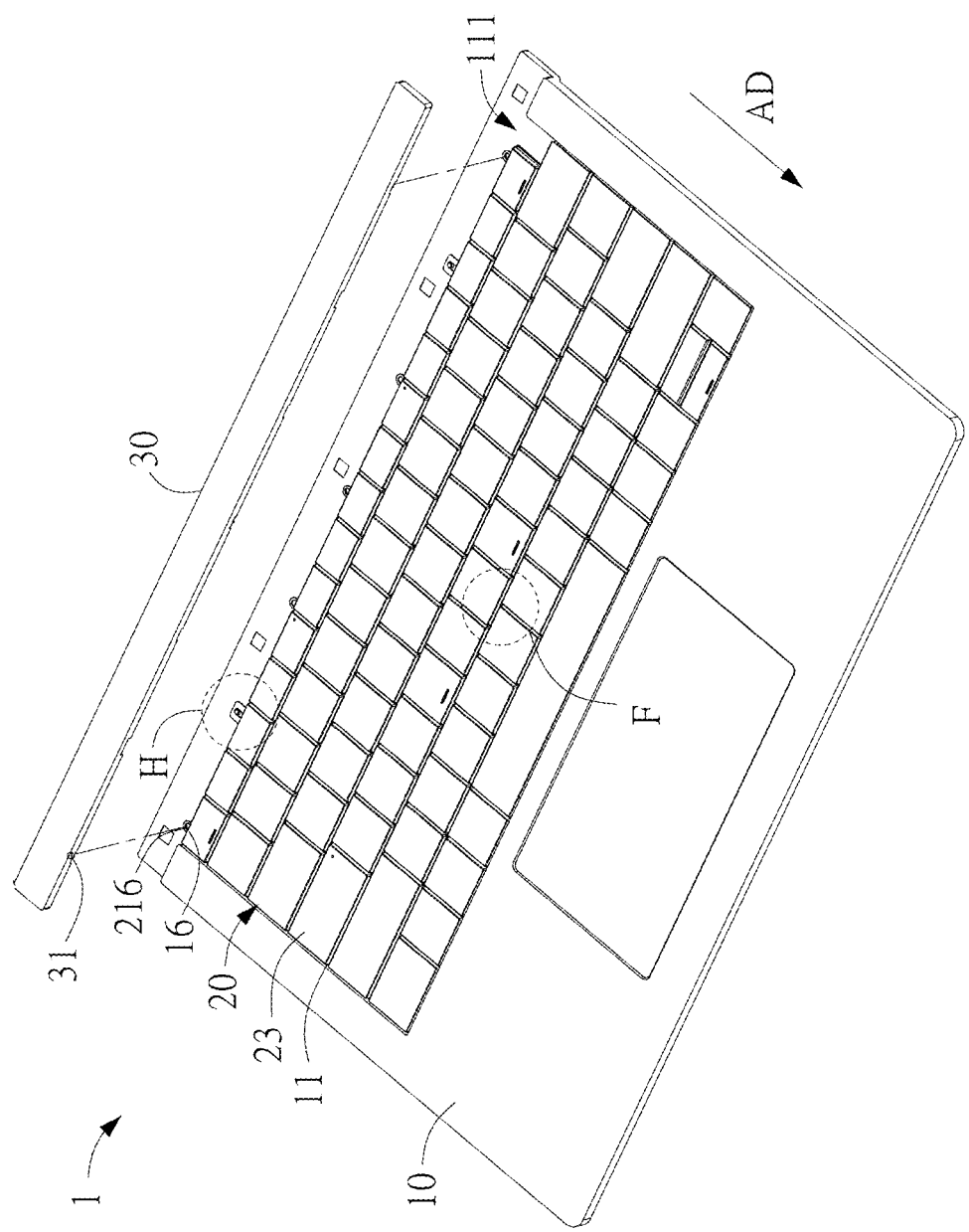
FIG. 8 is a schematic diagram after the keyboard module is completely placed into the accommodating cavity as shown in FIG. 6.

FIG. 5 is a schematic diagram of the keyboard module and housing before assembly as shown in FIG. 1; FIG. 6 is a schematic diagram of the keyboard module being placed into the accommodating cavity of the housing as shown in FIG. 5; FIG. 7 is an enlarged view of the base plate and housing in area E as shown in FIG. 6; and FIG. 8 is a schematic diagram after the keyboard module is completely placed into the accommodating cavity as shown in FIG. 6. Please refer to FIG. 5, FIG. 6, FIG. 7, and FIG. 8. By the aforementioned structures, when assembling the portable electronic device 1 of this embodiment, the keyboard module 20 is first positioned corresponding to the housing 10. The keyboard module 20 is then inserted into the accommodating cavity 11 from the opening side 111, and pushed along the assembly direction AD toward the bottom edge 112 of the accommodating cavity 11. At this point, there remains a gap S between the keyboard module 20 and the bottom edge 112 of the accommodating cavity 11 (as shown in FIG. 6), and the second engagement structure 212a has not yet engaged with the first engagement structure 13 (as shown in FIG. 7). It should be noted that FIG. 7 uses the second engagement structure 212a as an example, while the second engagement structures 212, 212b and their corresponding first engagement structures 13 are similarly in a separated state and have not yet abutted each other.

Subsequently, only need to apply a force on the keyboard module 20 so that the keyboard module 20 is completely abutted against the bottom edge 112 of the accommodating cavity 11, as shown in FIG. 8. At this point, the second engagement structures 212, 212a, and 212b each move to the bottom side of the first engagement structure 13, causing the second abutting portions 2122, 2122a, and 2122b to respectively abut against the first abutting portion 132, as shown in FIG. 4A, FIG. 4B, and FIG. 4C. Therefore, in this embodiment, the keyboard module 20 can be secured to the housing 10 by simply sliding it into the accommodating cavity 11 from the opening side 111, achieving the effect of quick assembly. Conversely, if the keyboard module 20 needs to be disassembled, the same quick-release effect can be achieved by moving the keyboard module 20 in the opposite direction.

Figure 9:
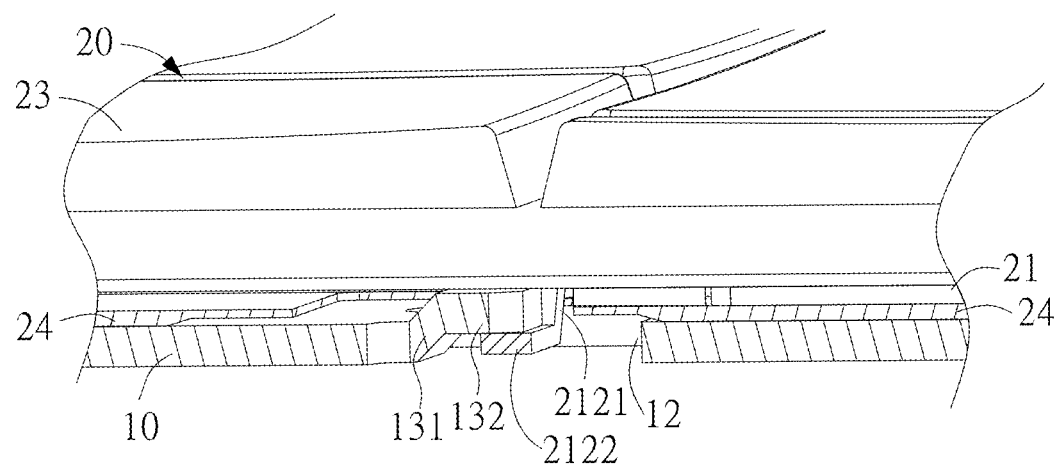
FIG. 9 is a cross-sectional view of area F as shown in FIG. 8.

FIG. 9 is a cross-sectional view of area F as shown in FIG. 8. Please refer to FIG. 4A, FIG. 8 and FIG. 9. As previously mentioned, when the keyboard module 20 fully abuts the bottom edge 112 of the accommodating cavity 11, the second abutting portion 2122 moves to the bottom side of the first engagement structure 13 and abuts the first abutting portion 132. At this point, the second abutting portion 2122 is located within the first mounting hole 12 of the housing 10 and is located below the first abutting portion 132, as shown in FIG. 9. Preferably, the bottom of the second abutting portion 2122 of this embodiment is also located within the first mounting hole 12. In other words, the bottom of the second abutting portion 2122 is higher than the bottom side of the housing 10 (i.e., the C-cover), so that the bottom of the second abutting portion 2122 is located within the first mounting hole 12. Positioning the second abutting portion 2122 within the first mounting hole 12 prevents interference with electronic components located beneath the housing 10 (i.e., the C-cover).

Figure 10A:
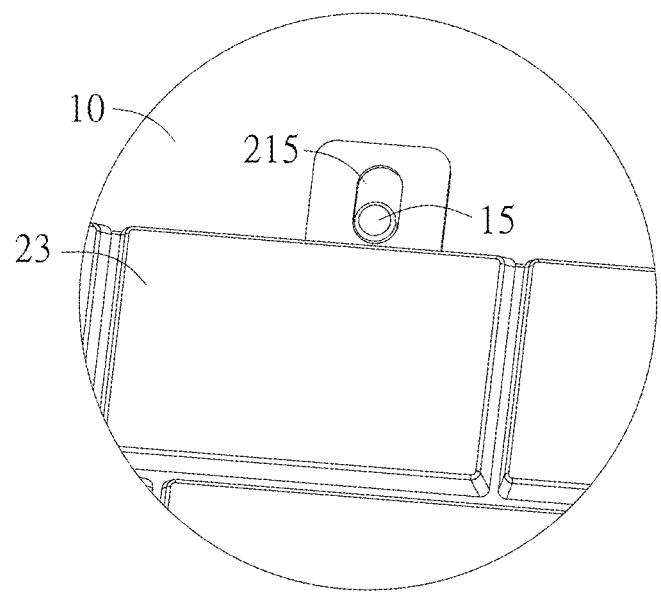
FIG. 10A is an enlarged view of area G as shown in FIG. 6.
Figure 10B:
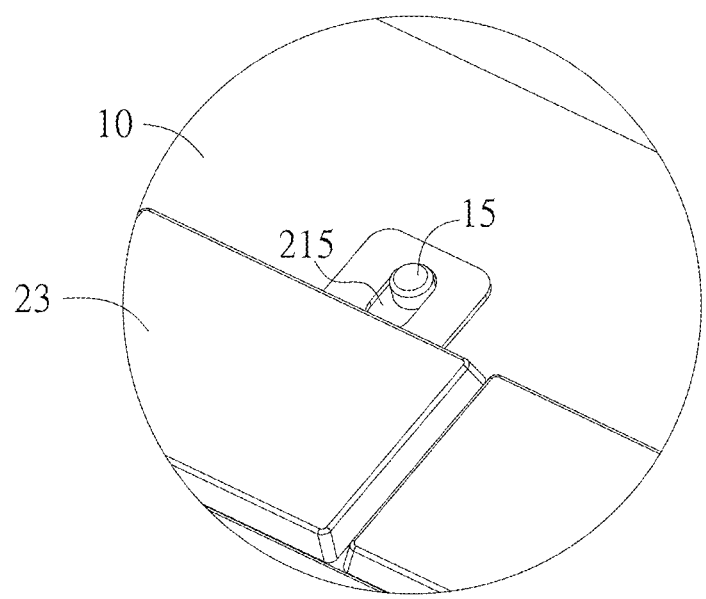
FIG. 10B is an enlarged view of area H as shown in FIG. 8.

FIG. 10A is an enlarged view of area G as shown in FIG. 6, and FIG. 10B is an enlarged view of area H as shown in FIG. 8. Please refer to FIG. 2, FIG. 3, FIG. 6, FIG. 8, FIG. 10A, and FIG. 10B. Preferably, the base plate 21 of this embodiment further comprises a first positioning hole 215, which is disposed on the side edge of the base plate 21. For example, the first positioning hole 215 can be disposed on the side wall of the base plate 21 corresponding to the opening side 111. Specifically, the sidewall of the base plate 21 corresponding to the opening side 111 extends outward to form a protrusion, and a hole is formed on the protrusion to create the first positioning hole 215. Additionally, the first positioning hole 215 is an elongated hole, with its long-axis direction parallel to the assembly direction AD. Correspondingly, the housing 10 comprises a first positioning post 15. When the keyboard module 20 is assembled into the accommodating cavity 11 of the housing 10 (as shown in the state of FIG. 6), the first positioning post 15 can simultaneously pass through the first positioning hole 215, so that the first positioning post 15 can be located within the first positioning hole 215. Further, the first positioning post 15 is initially placed on the lower side of the lower side of the first positioning hole 215, as shown in FIG. 10A.

Subsequently, the keyboard module 20 moves along the assembly direction AD until it abuts the bottom edge 112 of the accommodating cavity 11 (as shown in the state of FIG. 8). Simultaneously, the first positioning hole 215 moves so that the first positioning post 15 is located at the upper side of the first positioning hole 215, as shown in FIG. 10B. Thus, the width of the first positioning hole 215 and the size of the first positioning post 15 can be designed according to the desired movement distance during the assembly of the keyboard module 20. With the structure of the first positioning hole 215 and the first positioning post 15, a specific movement distance of the keyboard module 20 during assembly can be ensured, so as to avoid incomplete assembly or excessive movement that could damage the first engagement structure 13 and the second engagement structure 212.

Figure 11:
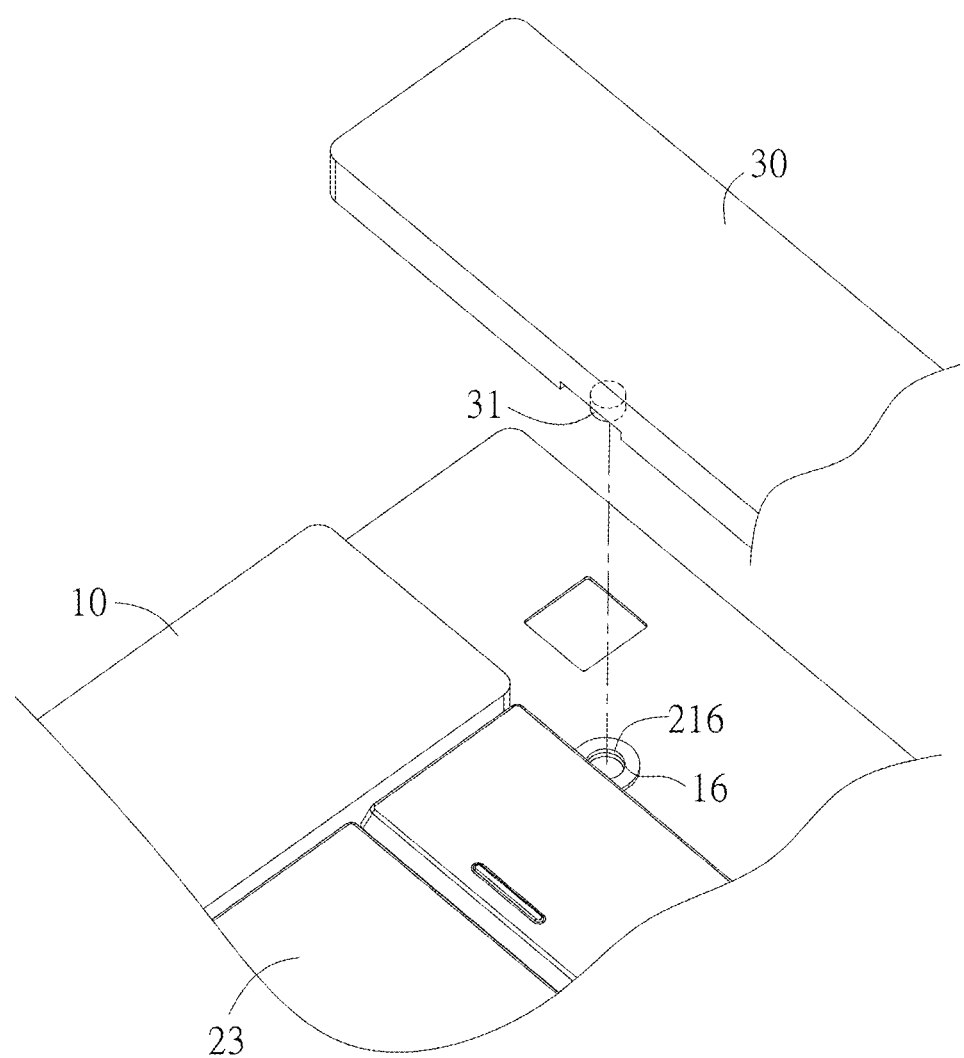
FIG. 11 is a partially enlarged view of the upper left corner of the portable electronic device as shown in FIG. 8.

FIG. 11 is a partially enlarged view of the upper left corner of the portable electronic device as shown in FIG. 8. Please refer to FIG. 2, FIG. 3, FIG. 8, and FIG. 11. In this embodiment, the portable electronic device 1 further comprises a pressing strip 30. Thus, the portable electronic device 1 can be applied to a laptop that have a pressing strip 30. Preferably, the base plate 21 of this embodiment further comprises a second positioning hole 216, which is disposed on the side of the base plate 21. In this embodiment, the second positioning hole 216 is similarly disposed on the side edge of the base plate 21 corresponding to the opening side 111 of the accommodating cavity 11. Similarly, the side wall of the base plate 21 corresponding to the opening side 111 extends outward to form a protrusion, and a hole is formed on the protrusion to create the second positioning hole 216. Additionally, the housing 10 comprises a third positioning hole 16, which is adjacent to the opening side 111, as shown in FIG. 2. When the keyboard module 20 moves to abut the bottom edge 112 of the accommodating cavity 11, the first positioning post 15 is located at the upper side of the first positioning hole 215 (as shown in the state shown of FIG. 8 and FIG. 10B), the second positioning hole 216 overlaps the third positioning hole 16, as shown in FIG. 11.

Furthermore, the pressing strip 30 of the present embodiment has a second positioning post 31. When the second positioning hole 216 and the third positioning hole 16 are overlapped, the second positioning post 31 can pass through the second positioning hole 216 and the third positioning hole 16 to secure the pressing strip 30 to the housing 10, and to fix the keyboard module 20 to the housing 10 at the same time.

As described above, the portable electronic device with the keyboard according to the present disclosure comprises the housing and the keyboard module. The housing comprises the first mounting hole and the first engagement structure. The first engagement structure comprises the first inclined portion and the first abutting portion. The base plate of the keyboard module comprises the second mounting hole and the second engagement structure. When the keyboard module is assembled into the housing, the downwardly extending second engagement structure can be inserted into the bottom of the upwardly extending first engagement structure, so that the first abutting portion and the second abutting portion abut each other, thereby quickly securing the relative position between the housing and the keyboard module. As a result, the keyboard module can be fixed to the housing by simply translating it into the accommodating cavity of the housing, thus achieving rapid assembly effect. Conversely, if the keyboard module needs to be disassembled, the same rapid disassembly effect can be achieved by moving the keyboard module in the reverse direction.

Although the present disclosure has been explained in relation to its preferred embodiments, it is to be understood that many other possible modifications and variations can be made without departing from the spirit and scope of the disclosure as hereinafter claimed.

What is claimed is:

1. A portable electronic device having a keyboard, comprising: a housing, comprising: an accommodating cavity; at least one first mounting hole, located in the accommodating cavity; and at least one first engagement structure, comprising a first inclined portion and a first abutting portion, one end of the first inclined portion being connected to one side wall of the first mounting hole, and the other end of the first inclined portion extending upward and in the direction of the first mounting hole and connected to the first abutting portion; and a keyboard module, comprising: a base plate, comprising at least one second mounting hole and at least one second engagement structure, the second engagement structure comprising a second inclined portion and a second abutting portion, one end of the second inclined portion being connected to one side wall of the second mounting hole, and the other end of the second inclined portion extending downward and in the direction of the second mounting hole and connected to the second abutting portion, wherein when the keyboard module is assembled into the accommodating cavity of the housing along an assembly direction, the first abutting portion and the second abutting portion abut each other; and wherein the housing further comprises a third mounting hole, which comprises a first portion and a second portion connected with each other, the base plate further comprises a third engagement structure, which comprises a connecting rod and an engagement portion, two opposite ends of the connecting rod are respectively connected to the base plate and the engagement portion, an inner diameter of the first portion is larger than an outer diameter of the engagement portion, an inner diameter of the second portion is smaller than the outer diameter of the engagement portion and larger than an outer diameter of the connecting rod.

2. The portable electronic device having the keyboard according to claim 1, wherein an extension direction of the first engagement structure is parallel to the assembly direction.

3. The portable electronic device having the keyboard according to claim 1, wherein the second engagement structure further comprises a third inclined portion, one end of the third inclined portion is connected to the other side wall of the second mounting hole, and the other end of the third inclined portion extends downward and in the direction of the second mounting hole and is connected to the second abutting portion, wherein two opposite ends of the second abutting portion are respectively connected to the second inclined portion and the third inclined portion.

4. The portable electronic device having the keyboard according to claim 3, wherein the second engagement structure further comprises a reinforcing portion, extending downward from a side wall of the second mounting hole between the second inclined portion and the third inclined portion, and connected to the second inclined portion and the third inclined portion.

5. The portable electronic device having the keyboard according to claim 1, wherein the second engagement structure is perpendicular to the assembly direction.

6. The portable electronic device having the keyboard according to claim 1, wherein the base plate further comprises a first positioning hole, disposed on one side edge of the base plate, a long-axis direction of the first positioning hole is parallel to the assembly direction, the housing comprises a first positioning post, located within the first positioning hole.

7. The portable electronic device having the keyboard according to claim 6, wherein when the keyboard module is assembled into the accommodating cavity of the housing, the first positioning post is initially placed within the first positioning hole at a lower side, and after the keyboard module moves along the assembly direction, the first positioning post is located within the first positioning hole at an upper side.

8. The portable electronic device having the keyboard according to claim 7, wherein the base plate further comprises a second positioning hole, disposed on one side edge of the base plate, the housing further comprises a third positioning hole, when the first positioning post is located within the first positioning hole at the upper side, the second positioning hole overlaps with the third positioning hole.

9. The portable electronic device having the keyboard according to claim 8, further comprising:
a pressing strip, comprising a second positioning post, the second positioning post passes through the second positioning hole and the third positioning hole so as to fix the pressing strip on the housing.

10. The portable electronic device having the keyboard according to claim 1, wherein when the keyboard module is assembled into the housing along the assembly direction, the third engagement structure is accommodated in the third mounting hole and moves from the first portion to the second portion, the engagement portion is fixed to the bottom of the second portion.

11. The portable electronic device having the keyboard according to claim 1, wherein the width of the second inclined portion tapers from the side wall of the second mounting hole towards the second abutting portion.

12. The portable electronic device having the keyboard according to claim 1, wherein the bottom of the second abutting portion is located within the first mounting hole of the housing.

13. The portable electronic device having the keyboard according to claim 1, wherein the base plate further comprises at least one through hole, located adjacent to the second mounting hole and near the second inclined portion.

* * * * *